United States Patent
Tsirkin

(10) Patent No.: US 9,459,900 B2
(45) Date of Patent: Oct. 4, 2016

(54) HYPERVISOR-BASED BALLOON PAGE INITIALIZATION

(71) Applicant: Red Hat Israel, Ltd., Ra'anana (IL)

(72) Inventor: Michael S. Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 142 days.

(21) Appl. No.: 14/153,941

(22) Filed: Jan. 13, 2014

(65) Prior Publication Data

US 2015/0199209 A1 Jul. 16, 2015

(51) Int. Cl.
*G06F 9/46* (2006.01)
*G06F 21/00* (2013.01)
*G06F 9/455* (2006.01)
*G06F 9/50* (2006.01)

(52) U.S. Cl.
CPC ....... *G06F 9/45545* (2013.01); *G06F 9/45558* (2013.01); *G06F 9/5016* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 7,433,951 B1 * | 10/2008 | Waldspurger | 709/226 |
| 7,533,382 B2 | 5/2009 | Karim | |
| 7,702,843 B1 | 4/2010 | Chen et al. | |
| 7,739,466 B2 | 6/2010 | Rozas et al. | |
| 7,788,461 B2 | 8/2010 | Rawson, III | |
| 7,805,723 B2 * | 9/2010 | Lowell | 718/1 |
| 8,046,641 B2 | 10/2011 | Hernandez et al. | |
| 8,145,763 B2 | 3/2012 | Waldspurger | |
| 8,261,265 B2 | 9/2012 | Chen et al. | |
| 8,296,760 B2 * | 10/2012 | Magenheimer et al. | 718/1 |
| 8,392,628 B2 | 3/2013 | Santos et al. | |
| 8,533,382 B2 * | 9/2013 | Scales et al. | 711/6 |
| 8,583,875 B1 * | 11/2013 | Garthwaite et al. | 711/147 |
| 8,832,352 B2 * | 9/2014 | Tsirkin | G06F 9/45558 711/163 |
| 8,838,913 B1 * | 9/2014 | Conover | G06F 9/45558 711/154 |
| 8,938,571 B1 * | 1/2015 | Vincent | 711/6 |
| 8,943,260 B2 * | 1/2015 | Ben-Yehuda et al. | 711/6 |
| 9,038,084 B2 * | 5/2015 | Accapadi | G06F 9/45558 709/226 |
| 9,086,957 B2 * | 7/2015 | Cordero et al. | |
| 2005/0172098 A1 * | 8/2005 | Worley | G06F 12/1036 711/206 |
| 2007/0174505 A1 | 7/2007 | Schlansker et al. | |
| 2008/0256321 A1 * | 10/2008 | Armstrong et al. | 711/173 |
| 2009/0025006 A1 | 1/2009 | Waldspurger | |
| 2009/0037936 A1 | 2/2009 | Serebrin | |
| 2009/0172243 A1 * | 7/2009 | Champagne et al. | 711/3 |
| 2009/0327576 A1 * | 12/2009 | Oshins | G06F 9/45533 711/6 |
| 2009/0328074 A1 * | 12/2009 | Oshins | G06F 9/45537 719/321 |
| 2010/0299667 A1 | 11/2010 | Ahmad et al. | |
| 2011/0107044 A1 * | 5/2011 | Young et al. | 711/162 |

(Continued)

OTHER PUBLICATIONS

Hines, Michael R., et al., Post-Copy Based Live Virtual Machine Migration Using Adaptive Pre-Paging and Dynamic Self-Ballooning, Binghamton University, NY, USA, http://dl.acm.org/citation.cfm?id=1508301, 2009, 10 pages.

(Continued)

*Primary Examiner* — Tuan Q. Dam
*Assistant Examiner* — Zheng Wei
(74) *Attorney, Agent, or Firm* — Haynes & Boone, LLP

(57) ABSTRACT

Methods, systems, and computer program products for hypervisor-based balloon page initialization are provided. A computer-implemented method may include receiving, by a hypervisor, a memory page from a guest, returning the memory page to the guest, and notifying the guest that the hypervisor is to initialize the returned memory page.

20 Claims, 5 Drawing Sheets

(56) References Cited

U.S. PATENT DOCUMENTS

| | | |
|---|---|---|
| 2011/0138147 A1 | 6/2011 | Knowles et al. |
| 2011/0213911 A1* | 9/2011 | Eidus et al. ............... 711/6 |
| 2011/0283071 A1* | 11/2011 | Yokoya et al. ............ 711/162 |
| 2012/0017029 A1* | 1/2012 | Santos et al. ............. 711/6 |
| 2012/0072906 A1 | 3/2012 | Tsirkin et al. |
| 2012/0216007 A1* | 8/2012 | Tsirkin ..................... 711/173 |
| 2012/0239850 A1 | 9/2012 | Qiu et al. |
| 2012/0290765 A1* | 11/2012 | Durrant ..................... 711/6 |
| 2013/0138863 A1* | 5/2013 | Tsirkin et al. ............ 711/6 |
| 2013/0159579 A1 | 6/2013 | Neiger et al. |
| 2013/0159639 A1* | 6/2013 | Corrie ...................... 711/154 |
| 2013/0290641 A1* | 10/2013 | Corrie ...................... 711/133 |
| 2013/0297849 A1* | 11/2013 | Wagner .................... 711/6 |
| 2013/0325912 A1* | 12/2013 | Corrie ...................... 707/813 |
| 2013/0326110 A1* | 12/2013 | Tsirkin .............. G06F 9/45558 711/6 |
| 2013/0339568 A1* | 12/2013 | Corrie ...................... 711/6 |
| 2014/0026132 A1* | 1/2014 | Canton ..................... 718/1 |
| 2014/0149674 A1* | 5/2014 | Solihin .................... 711/133 |
| 2014/0181811 A1* | 6/2014 | Tsirkin .............. G06F 9/45558 718/1 |
| 2014/0223126 A1* | 8/2014 | Ye ............................ 711/162 |
| 2014/0229935 A1* | 8/2014 | Mitra et al. .............. 718/1 |
| 2014/0379955 A1* | 12/2014 | Dong et al. .............. 711/6 |
| 2015/0033002 A1* | 1/2015 | Cordero et al. ......... 713/1 |

OTHER PUBLICATIONS

Wang, Xiaolin, et al., Dynamic Memory Paravirtualization Transparent to Guest OS, Dept. of Computer Science and Technology, Peking University, Beijing, China; Dept. of Computer Science, Michigan Technological University, Houghton, USA, http://link.springer.com/article/10.1007/s11432-010-0008-x, Jan. 2010, 12 pages.

Zhang, Binbin, et al., Evaluating and Optimizing I/O Virtualization in Kernel-based Virtual Machine (KVM), Dept. of Computer Science and Technology, Peking University, Beijing, China; Dept. of Computer Science, Michigan Technological University, Houghton, USA, http://link.springer.com/chapter/10.1007/978-3-642-15672-4_20, 2010, 26 pages.

Chiang, Jui-Hao, et al., Working Set-Based Physical Memory Ballooning, http://0b4af6cdc2f0c5998459-c0245c5c937c5dedcca3f1764ecc0b2f.r43.cf2.rackcdn.com/11729-icac13_chiang.pdf 2013, 5 pages.

Bonzini, Paolo, (Patch) Virtio-Balloon Spec: "Provide a Version of the "Silent Deflate" Feature That Works," Sep. 7, 2012, 4 pages.

* cited by examiner

HYPERVISOR-BASED BALLOON PAGE INITIALIZATION

TECHNICAL FIELD

Examples of the present disclosure generally relate to virtualized computing systems, and more specifically, relate to memory management in virtual machines.

BACKGROUND

A virtual machine (VM) is a software-based implementation of a physical computing environment that includes its own virtual resources (e.g., CPU, RAM, disk storage, network connectivity). Multiple virtual machines may run on a single host computer system while sharing physical computing resources of the host. It may be useful to temporarily reallocate memory from a virtual machine for another purpose, for example, to supply the host or another virtual machine with additional memory for a short time.

Memory ballooning generally describes a method of virtual memory management where virtual machine memory may be temporarily reassigned for another purpose. For example, an amount of virtual machine memory may be placed in a reserved area called a balloon. The memory then may be reallocated and used for other purposes while it remains in the balloon. The memory then may be removed from the balloon and returned to the virtual machine at a later time.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DETAILED DESCRIPTION

Figure 1:
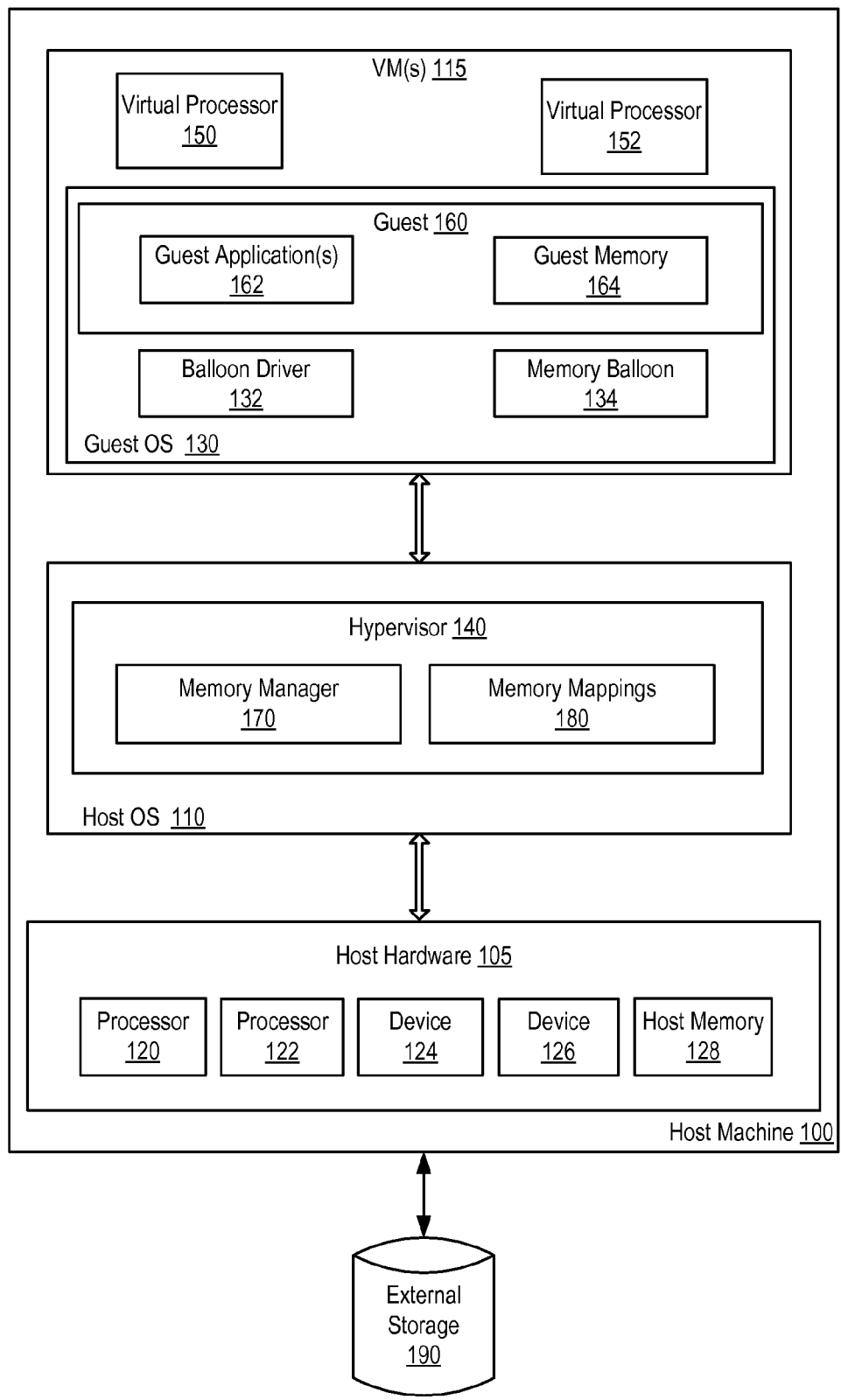
FIG. 1 is a block diagram illustrating an example of a computer system hosting one or more virtual machines.

Disclosed herein are systems, methods, and computer program products for providing hypervisor-based balloon page initialization.

In an example, memory controlled by a virtual machine guest may be temporarily reclaimed and used for another purpose. For example, a hypervisor may detect a condition on a host machine or a different guest on the host where providing additional memory would be useful. The hypervisor then may reclaim some memory from the guest and allocate it elsewhere. The hypervisor then may initialize and return the memory it borrowed from the guest, for example, when the hypervisor has finished using the memory.

In an example, a guest is unaware that a hypervisor has initialized the returned memory. For example, the hypervisor may use a process external to or other than the guest to return the memory. When the guest is unaware that the returned memory is already initialized, the guest may perform unnecessary examination or initialization of the memory.

In an example, a hypervisor reclaims memory from a guest and initializes the memory before returning it to the guest. The hypervisor then notifies the guest that the returned memory has been initialized. The notification allows the guest to begin using the returned memory without having to examine or reinitialize memory that already has been initialized.

In an example, a hypervisor defers initialization of memory it returns to a guest. For example, the hypervisor may indicate to the guest that the returned memory is initialized. The hypervisor then may initialize the memory at a later time, for example, when the hypervisor detects or intercepts an event, such as when a guest application first writes to the memory.

In an example, a guest receives memory returned from a memory balloon by a hypervisor. The guest then receives a notification from the hypervisor indicating that the hypervisor has initialized the memory returned from the memory balloon. The guest then manages the memory returned from the memory balloon as initialized memory. For example, the guest may allocate the returned memory to a guest application without examining or performing its own initialization of the returned memory. Thus, a guest may manage memory returned from a memory balloon more efficiently when the guest is aware that the returned memory was initialized by the hypervisor.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

FIG. 1 is a block diagram that illustrates an example of a physical computer system, referred to herein as a host machine 100, that hosts one or more virtual machines VM(s) 115. Host machine 100 may be a rackmount server, a workstation, a desktop computer, a notebook computer, a tablet computer, a game console, a mobile phone, a palm-sized computing device, a personal digital assistant (PDA), etc.

Host machine 100 includes host hardware 105, which includes multiple processors 120, 122, multiple devices 124, 126, host memory 128, and other hardware components. Host memory 128 may include volatile memory devices (e.g., random access memory (RAM)), non-volatile memory devices (e.g., flash memory), and/or other types of memory devices. Host hardware 105 also may be coupled to external storage 190 via a direct connection or a local network. Host machine 100 may be a single machine or multiple host machines arranged in a cluster.

The term "processor," as used herein, refers to a single processor core. Each processor 120, 122 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores.

In one example, processors 120, 122 are processor cores of the same integrated circuit and share a socket. Processors that share a socket may communicate with one another more efficiently than processors that do not share a socket.

Each of the devices 124, 126 may be a physical device that is internal or external to host machine 100. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 190), external I/O devices, etc. Devices 124, 126 communicate with host machine 100 (e.g., notify host machine 100 of events) by generating device interrupts.

Host machine 100 includes a hypervisor 140 (also known as a virtual machine monitor (VMM)). In one example (as shown), hypervisor 140 is a component of a host operating system 110. Alternatively, hypervisor 140 may run on top of a host OS 110, or may run directly on host hardware 105 without the use of a host OS 110.

Hypervisor 140 manages system resources, including access to host memory 128, devices 124, 126, secondary storage, and so on. Hypervisor 140, though usually implemented in software, may emulate and export a bare machine interface (host hardware 105) to higher-level software. Such higher-level software may comprise a standard or real-time operating system (OS), may be a highly stripped down operating environment with limited operating system functionality, may not include traditional OS facilities, etc. Hypervisor 140 presents to other software (i.e., "guest" software) the abstraction of one or more virtual machines (VMs) 115, which may provide the same or different abstractions to various guest software (e.g., guest operating system 130, guest applications 162, etc.).

Host machine 100 hosts any number of virtual machines (VMs) 115 (e.g., a single VM, one hundred VMs, etc.). A virtual machine (VM) 115 is a combination of guest software that uses an underlying emulation of host machine 100 (e.g., as provided by hypervisor 140). Virtual machines (VMs) 115 can be, for example, hardware emulation, full virtualization, para-virtualization, and operating system-level virtualization virtual machines.

The term "virtual machine" (VM) generally refers to part of a host system that is visible to the guest. A virtual machine may include, for example, memory, virtual CPUs (e.g., virtual processors 150, 152), virtual devices (e.g., emulated NIC or disk), physical devices over which a guest is given partial or full control, firmware such as a Basic Input/Output System (BIOS), an Extensible Firmware Interface (EFI), an Advanced Configuration and Power Interface (ACPI), etc.

In an example, a virtual machine (VM) 115 runs a guest 160 that uses a guest operating system (OS) 130 to manage its resources. The term "guest" generally refers to the computer readable instructions run on a hypervisor 140 that is installed on a disk, loaded into memory, or currently running. A guest 160 may include, for example, a copy of firmware in memory, an operating system, additional installed software, a browser, applications running in a browser, etc. In one example, virtual machines (VMs) 115 running on a host machine 100 each may run the same or a different guest OS 130, such as Linux®, Solaris®, Mac® OS, Windows®, etc.

Guest 160 includes guest application(s) 162, guest memory 164, balloon driver 132, and memory balloon 134. One or more guest application(s) 162 may run on guest 160. In an example, a guest application 162 may be a process or other type of software application that executes (i.e., runs) on a guest 160. In one example, a guest application 162 also may refer to a process or application that runs on a guest OS 130.

Guest memory 164 generally describes memory allocated to and available for use by a guest 160. In an example, guest memory 164 may be memory presented to guest 160 by hypervisor 140. In one example, guest memory 164 is mapped to and provided using corresponding memory from a host machine 100 (e.g., host memory 128). For example, a unit of guest memory 164 may be mapped to and provided using a corresponding unit of host memory 128. A unit of memory generally refers to any subset, portion, piece, range, or region of memory (e.g., guest memory, host memory). Such "areas of memory" or "memory areas" may be referred to, as pages, blocks, extents, or any other type of measurable unit(s).

Balloon driver 132 may be a computer program installed on guest OS 130. In an example, hypervisor 140 uses balloon driver 132 to perform memory balloon operations involving guest memory 164. For example, hypervisor 140 may use balloon driver 132 to inflate and deflate a memory balloon 134, for example, to reclaim/return guest memory 164 from/to a guest 160.

Memory balloon 134 may be a reserved area of a guest OS 130 that is inaccessible to a guest 160 or that limits operations that the guest 160 may perform. For example, memory pages that have been placed in a memory balloon 134 may be hidden from a guest 160, inaccessible to a guest 160, or protected from guest 160 access. In one example, a memory balloon 134 may refer to a classification or status of memory. For example, memory pages removed from guest memory 164 may be tagged with a status (e.g., "reserved," "unavailable," etc.) to indicate that corresponding memory pages may not be used by a guest 160.

Hypervisor 140 includes a memory manager 170 and memory mappings 180. In an example, hypervisor 140 uses memory manager 170 to perform memory operations involving guest memory 164 and/or host memory 128. In one example, memory manager 170 performs memory balloon operations allowing a hypervisor 140 to obtain and use memory pages from a guest 160.

In an example, memory manager 170 tracks and manages mappings between guest memory 164 and host memory 128 in memory mappings 180. For example, memory manager 170 may maintain a table, list or other structure that associates an address of guest memory 164 (e.g., a guest address) with an address of corresponding host memory 128 (e.g., a host address). A "guest address" generally may refer to either a virtual or physical guest memory address. In addition, a "host address" generally may refer to either a virtual or physical host memory address.

Memory ballooning generally refers to a method of virtual memory management that allows a hypervisor 140 to use memory allocated to a guest 160. In an example, hypervisor 140 may become aware of a low memory condition that exists on a host machine 100. For example, hypervisor 140 may detect a low amount of available host memory 128 by examining resources or performance counters associated with host machine 100. Hypervisor 140 also may receive a notification from performance monitoring software indicating that a low memory condition exists on a host machine 100.

In an example, guests 160 running on the host machine 100 may have guest memory 164 that is free or can be freed. Host memory 128 backing available guest memory 164 may be provided (e.g., temporarily repurposed) to host machine 100, for example, to address a low memory condition, or to perform other tasks. However, a guest 160 running inside of a VM 115 is generally unable to detect when a host machine 100 may benefit from additional memory. Further, a hypervisor 140 is generally unable to determine which guest memory pages 164 are free or can be freed.

In an example, memory ballooning allows a hypervisor 140 to use memory allocated to a guest 160. For example, a hypervisor 140 may use memory ballooning to address a low memory condition by shifting memory pressure from a host machine 100 to a guest 160. In an example, a hypervisor 140 borrows memory allocated to a guest 160 by inflating a memory balloon 134 on guest 160.

For example, memory manager 170 of hypervisor 140 may send a memory request to a balloon driver 132 installed on guest OS 130 over a private communication channel. In one example, the memory request may specify a target memory balloon 134 size corresponding to an amount of memory sought by the hypervisor 140.

In an example, balloon driver 132 "inflates" memory balloon 134 in response to receiving a request for guest memory 164 from memory manager 170. For example, balloon driver 132 may inflate a memory balloon 134 by pinning memory pages from guest memory 164 in the memory balloon 134. In one example, balloon driver 132 inflates a memory balloon 134 by placing a number of memory pages from guest memory 164 in a reserved area of guest OS 130 associated with the memory balloon 134. For example, the reserved area may be inaccessible to a guest 160 and/or may prevent the guest 160 from performing operations involving memory pages pinned in the memory balloon 134.

In an example, pages of host memory 128 used to provide guest memory 164 pinned in memory balloon 134 may be released to hypervisor 140. In one example, hypervisor 140 allocates host memory 128 received from a guest 160 to host machine 100. Hypervisor 140 also may allocate host memory 128 across one or more different guests 160.

In an example, balloon driver 132 sends hypervisor 140 identifiers of memory pages pinned in memory balloon 134. For example, balloon driver 132 may provide memory manager 170 with addresses of guest memory 164 pages that have been pinned in memory balloon 134. In one example, memory manager 170 may examine a collection of memory mappings 180 to determine which host addresses (e.g., for pages of host memory 128) correspond to guest addresses of memory pages in memory balloon 134. Memory manager 170 then may reallocate the identified pages of host memory 128 other purposes. For example, memory manager 170 may allocate some amount of memory it receives from a guest 160 to host machine 100 and/or for other purposes.

In an example, hypervisor 140 may return memory to guest 160 by deflating memory balloon 134. For example, memory manager 170 may send a request comprising a reduced target size for memory balloon 134 to balloon driver 132. In one example, balloon driver 132 releases a corresponding number of memory pages from memory balloon 134 to guest 160. In the example, the released memory pages may be accessed and used by guest 160.

In an example, hypervisor 140 initializes memory pages that it returns to a guest 160 before deflating a memory balloon 134. For example, memory manager 170 may initialize one or more pages of host memory 128 before sending balloon driver 132 a request to deflate memory balloon 134. In one example, hypervisor 140 may initialize memory pages it returns to a guest 160 for security-related purposes. For example, memory manager 170 may initialize memory pages to prevent inadvertent disclosure of host machine 100 information or another guest's information, which may remain in host memory 128 backing memory pages that are returned to a guest from a memory balloon 134.

However, since a hypervisor 140 usually communicates with a balloon driver 132 of a guest OS 130 to inflate and deflate a memory balloon 134, a guest 160 is generally unaware of page content. Thus, a guest 160 generally may not know whether memory returned from a hypervisor 140 using a memory balloon operation already has been initialized by the hypervisor 140.

In an example, a guest 160 initializes memory returned by a hypervisor 140 from a memory balloon operation. A guest 160 may initialize the returned memory to prevent disclosing random data from another source to a guest application 162 For example, a guest 160 first may examine a memory page returned by a hypervisor 140 to determine whether the memory page is initialized (e.g., is empty or comprises a predetermined initialization data). A guest 160 then may initialize a memory page when it determines that the memory page is uninitialized. In one example, a guest 160, by default, may initialize each memory page returned from a hypervisor 140 without examining memory page contents. Such operations are inefficient and unnecessary, for example, when a hypervisor 140 already has initialized memory returned to the guest 160. However, a guest 160 is usually unaware of the initialization status of memory pages returned from a memory balloon operation.

In an example, hypervisor 140 notifies guest 160 that the hypervisor 140 is to initialize memory pages returned to the guest 160 from a memory balloon operation. For example, a hypervisor 140 may indicate to the guest 160 that the hypervisor is handling initialization of returned memory pages so that the guest 160 is aware of an initialized status of the memory pages and does not perform unnecessary examination or re-initialization of the pages.

In one example, a hypervisor 140 performs initialization of a memory page before returning the memory page to a guest 160. In another example, a hypervisor 140 indicates to a guest 160 that a returned memory page has been initialized, and the hypervisor 140 may defer initialization of a memory page until later, for example, when detecting a first write operation to the returned memory page (e.g., either in guest memory 164 or in host memory 128).

In an example, a guest 160 receives notification that a hypervisor 140 is to handle initialization of returned balloon pages, and the guest 160 relies on the hypervisor 140 to provide initialization of the balloon pages. For example, a guest 160 may use memory pages that a hypervisor 140 indicates it will initialize to a guest application 162 without performing its own examination or initialization of the pages. In one example, the guest 160 may not examine or reinitialize the memory pages when the hypervisor 140 notifies the guest 160 that the memory pages are to be initialized by the hypervisor 140. Thus, the guest 160 may rely on hypervisor-based balloon page initialization to manage memory more efficiently.

Figure 2:
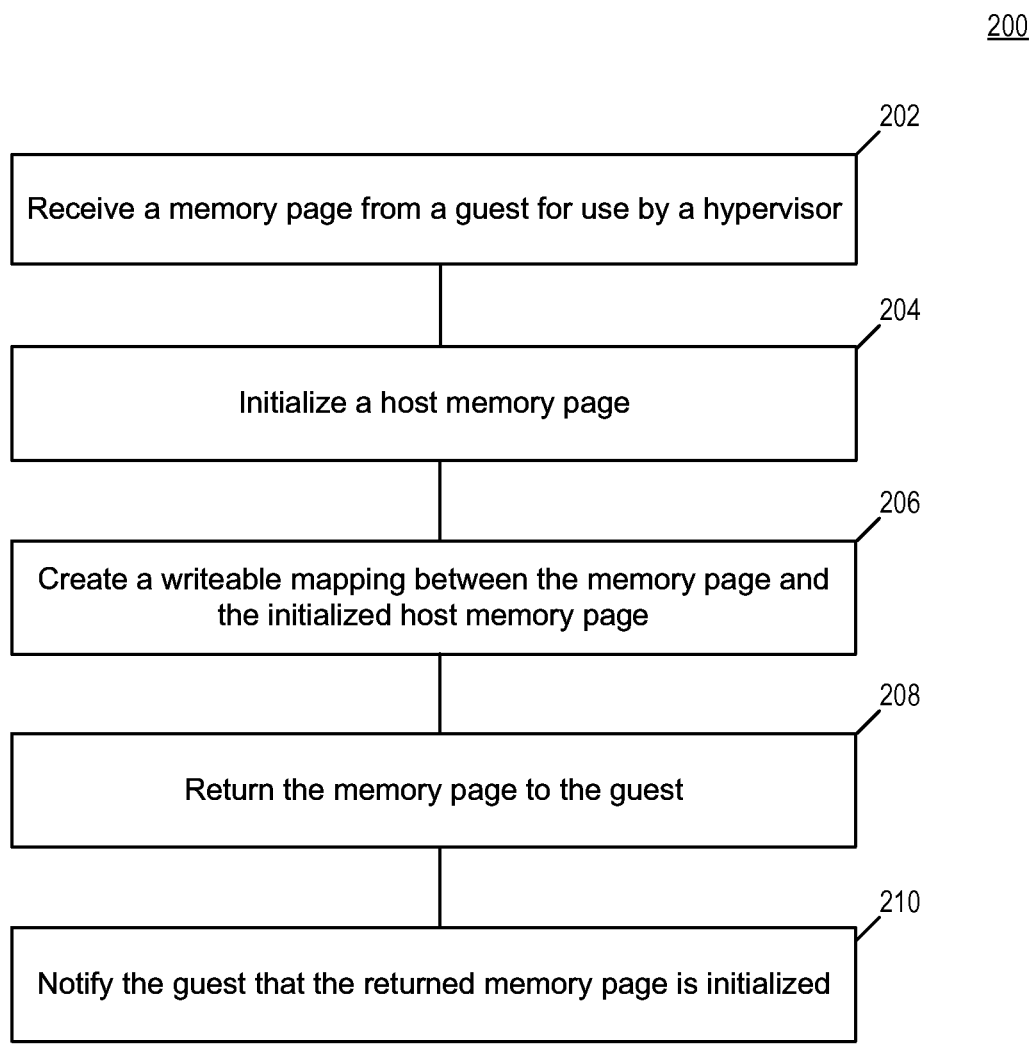
FIG. 2 is a flow diagram illustrating an example of a method for providing hypervisor-based balloon page initialization.

FIG. 2 is a flow diagram illustrating an example of a method for providing hypervisor-based balloon page initialization. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 200 is performed by hypervisor 140 of FIG. 1.

Method 200 begins at block 202 when a hypervisor 140 receives a memory page from a guest 160 for use by the hypervisor. In an example, hypervisor 140 receives pages of memory from guest 160 by inflating memory balloon 134. For example, memory manager 170 may send a direct message to balloon driver 132 on a private communication channel requesting an amount of memory from guest 160. In one example, the request indicates a target size for memory balloon 134, and balloon driver 132 "inflates" memory balloon 134 by moving available guest memory 164 to memory balloon 134.

In an example, guest memory 164 is reserved and unavailable to a guest 160 when pinned in memory balloon 134. Thus, a hypervisor 140 may reallocate and use host memory 128 that backs guest memory 164 pinned in a memory balloon 134.

In an example, balloon driver 132 responds to memory manager 170 by providing addresses and/or address ranges of guest memory 164 pinned in memory balloon 134. In one example, memory manager 170 uses the addresses and/or address ranges to determine corresponding host memory 128 available to hypervisor 140. For example, memory manager may examine memory mappings 180 between guest memory 164 and host memory 128 to identify host memory 128 returned from a memory balloon operation. Memory manager then may relocate the identified host memory 128, for example, to a host machine 100, another guest, or for various purposes.

At block 204, the hypervisor 140 initializes a host memory page. In an example, hypervisor 140 utilizes host memory 128 pages freed when corresponding guest memory 164 pages are pinned in a memory balloon 134. Since a hypervisor 140 may use host memory 128 it receives from a guest 160 for various purposes, the host memory 128 may contain random data, for example, from host machine 100, a different guest, or another source.

In an example, a hypervisor 140 initializes host memory 128 borrowed from a guest 160 before returning the memory to the guest 160 by deflating a memory balloon 134. For example, the hypervisor 140 may initialize the host memory 128 to prevent mixing data between various operations and/or subsystems. In one example, hypervisor 140 initializes host memory 128 to be returned to a guest to maintain security and confidentiality of data.

In an example, memory manager 170 may initialize host memory 128 by removing or overwriting contents of the host memory 128. For example, memory manager 170 may clear contents of host memory 128 and/or write data to host memory 128 when performing initialization. In one example, memory manager may initialize host memory 128 by filling host memory 128 pages with ones (e.g., "11111111"), zeros (e.g., "00000000"), or random data. In one example, memory manager initializes host memory 128 by filling associated memory pages with a value known to a guest to allow the guest to identify the memory as being initialized.

At block 206, the hypervisor 140 creates a writeable mapping between the returned memory page and the initialized host memory page. In an example, hypervisor 140 maps an initialized page of host memory 128 to guest memory 164 that the hypervisor 140 is to return to the guest 160. For example, memory manager 170 may create an entry in memory mappings 180 that associates initialized host memory 128 with guest memory 164 that is to be released from memory balloon 134. In one example, memory manager 170 may designate an association as "writeable" (e.g., at the host level) when host memory 128 backing the guest memory 164 is initialized, for example, to allow a guest 160 to use the initialized guest memory 164 without further involvement from hypervisor 140.

At block 208, the hypervisor 140 returns the memory page to the guest 160. In an example, hypervisor 140 deflates memory balloon 134 to return pages of guest memory 164 to a guest 160. For example, memory manager 170 may send a request to balloon driver 132 indicating a reduced target size for memory balloon 134. In one example, balloon driver 132 returns pages of guest memory 164 to the guest 160 by removing memory pages from memory balloon 134 so that the memory pages again may be used by the guest 160.

At block 210, the hypervisor 140 notifies the guest 160 that the hypervisor has initialized the returned memory page. For example, the hypervisor 140 may notify a guest 160 prior to, during, and/or after returning the memory pages to the guest 160 that it assumes responsibility for initializing guest memory pages 164. In one example, a hypervisor 140 may inform a guest 160 that guest memory 164 pages have been initialized so that the guest 160 may use the pages without examining or reinitializing the pages.

In an example, memory manager 170 sends a message to a guest 160 indicating that initialized memory pages are returned from a memory balloon operation. In one example, memory manager 170 examines memory mappings 180 to determine guest addresses of initialized guest memory 164 being returned to the guest 160. Memory manager 170 then may provide the determined guest addresses and/or corresponding guest address ranges to the guest 160. In one example, memory manager 170 sends a general notification to a guest indicating that each returned memory page from an operation has been initialized.

Figure 3:
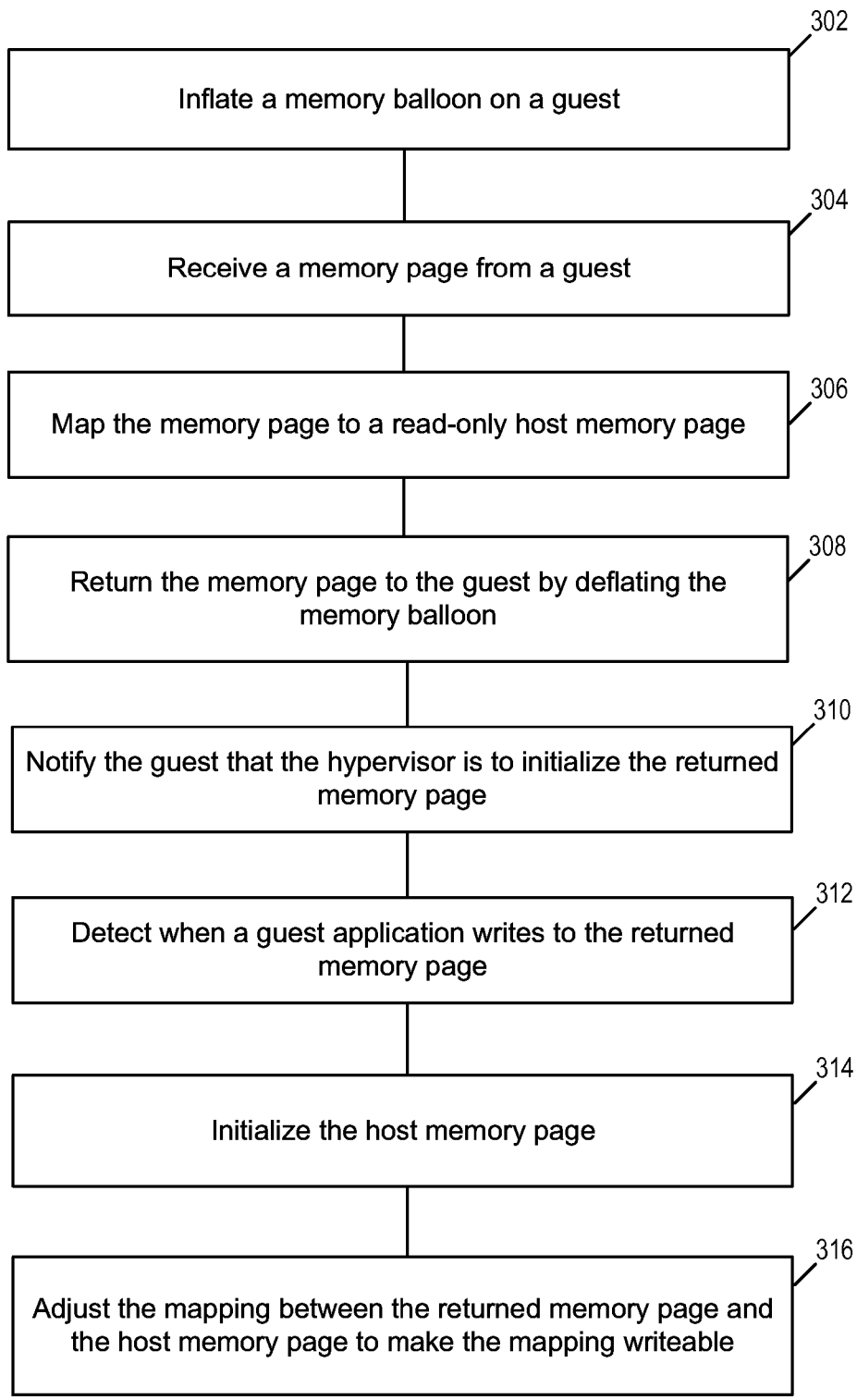
FIG. 3 is a flow diagram illustrating an example of a method for providing deferred hypervisor-based balloon page initialization

FIG. 3 is a flow diagram illustrating an example of a method for providing deferred hypervisor-based balloon page initialization. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 300 is performed by hypervisor 140 of FIG. 1.

Method 300 begins at block 302 when a hypervisor 140 inflates a memory balloon on a guest 160. In an example, memory manager 170 inflates memory balloon 134 by sending a request comprising a target balloon size to balloon driver 132. Balloon driver 132 then may inflate memory balloon 134 by pinning a corresponding amount of requested guest memory 164 in the memory balloon 134.

At block 304, the hypervisor 140 receives a memory page from the guest 160. In an example, memory pages pinned in a memory balloon 132 are unavailable to the guest 160. Thus, corresponding pages of host memory 128 may be returned to hypervisor 140. In one example, hypervisor 140 receives addresses and/or ranges of memory pages pinned in memory balloon 134 (e.g., from balloon driver 132). Hypervisor 140 then may determine addresses of host memory 128 it may borrow, for example, by examining memory mappings 180 between host memory 128 and guest memory 164.

In an example, hypervisor 140 discards contents of a memory page that it receives from a guest. For example, hypervisor 140 may delete or overwrite contents of a memory page received from a guest. In one example, hypervisor 140 discards memory page contents when it receives the memory page from a guest. Hypervisor 140 also may discard memory page contents prior to or when performing operations involving a memory page, after receiving the memory page from a guest.

At block 306, the hypervisor 140 maps the memory page to a read-only host memory page. In an example, a hypervisor 140 defers initialization of memory pages it returns to a guest 160. For example, memory manager 170 may create a read-only mapping between a page of host memory 128 and a corresponding page of guest memory 164 prior to deflating memory balloon 134. In one example, memory manager 170 updates memory mappings 180 to create a read-only host-level mapping between each host memory 128 page and a corresponding guest memory 164 page to be returned to a guest 160.

At block 308, the hypervisor 140 returns the memory page to the guest by deflating the memory balloon. In an example, memory manager 170 sends a request to balloon driver 132 with a reduced target size for memory balloon 134. In one example, balloon driver 132 responds by returning a corresponding amount of memory pages from memory balloon 134 back to guest memory 164.

At block 310, the hypervisor 140 notifies the guest that the hypervisor is to initialize the returned memory page. In an example, memory manager 170 sends a message to the guest 160 indicating one or more memory pages returned to the guest 160 from a memory balloon 134 are to be initialized by the hypervisor 140. In one example, the guest 160 may update information used to track initialization of guest memory 164. For example, the guest 160 may mark the memory pages returned from memory balloon 134 as initialized. In one example, the guest 160 is aware of and relies on initialization provided by the hypervisor 140. For example, the guest 160 may allocate guest memory 164 that the hypervisor 140 is to initialize to guest applications 162 as writeable memory.

In an example, hypervisor 140 provides notification to a guest 160 with each memory page or group of memory pages being returned to the guest indicating that the memory pages are initialized. In one example, a memory balloon 134 may use a balloon driver 132 that indicates to a guest 160 that memory pages returned to the guest 160 are initialized. For example, a balloon driver 132 may consider memory pages it receives from a memory balloon 134 to be initialized. A balloon driver 132 also may rely on information from a hypervisor 140 to determine that memory pages it receives from a memory balloon 134 are initialized.

At block 312, the hypervisor 140 detects when a guest application 162 writes to the returned memory page. In an example, a hypervisor 140 detects a page fault generated when a guest application 162 writes to a page of guest memory 164 having a read-only mapping to a host memory 128. In one example, a page fault may be generated when a hypervisor 140 defers initialization of guest memory 164 by creating a read-only host-level mapping between guest memory 164 and host memory 128 and when a guest application 162 writes to the guest memory 164. In one example, a guest 160 provides the guest application 162 with the guest memory 164 based on receiving notification that the hypervisor is to provide initialization of the guest memory 164. The hypervisor 140 then may perform the deferred initialization of the guest memory 164 in response to detecting a page fault or when intercepting a write operation to the guest memory 164.

At block 314, the hypervisor 140 initializes the host memory page. In an example, memory manager 170 initializes a page of host memory 128. For example, memory manager 170 may initialize a page of host memory 128 mapped to guest memory 164. In one example, memory manager 170 also may initialize one or more other pages of host memory 128.

At block 316, the hypervisor 140 adjusts the mapping between the returned memory page and the host memory page to make the mapping writeable. In an example, memory manager 170 updates a mapping between a page of guest memory 164 and an initialized page of host memory 128 by adjusting the mapping from read-only to writeable at the host-level. For example, memory manager 170 may adjust the mapping by updating an associated entry in memory mappings 180. In one example, the hypervisor 140 also may map the page of guest memory 164 to a different page of initialized host memory 128 and make the new mapping writeable. In some deferred initialization examples, write operations to guest memory 164 are resumed when the hypervisor 140 creates a writable host-level mapping between the guest memory 164 and initialized host memory 128.

Figure 4:
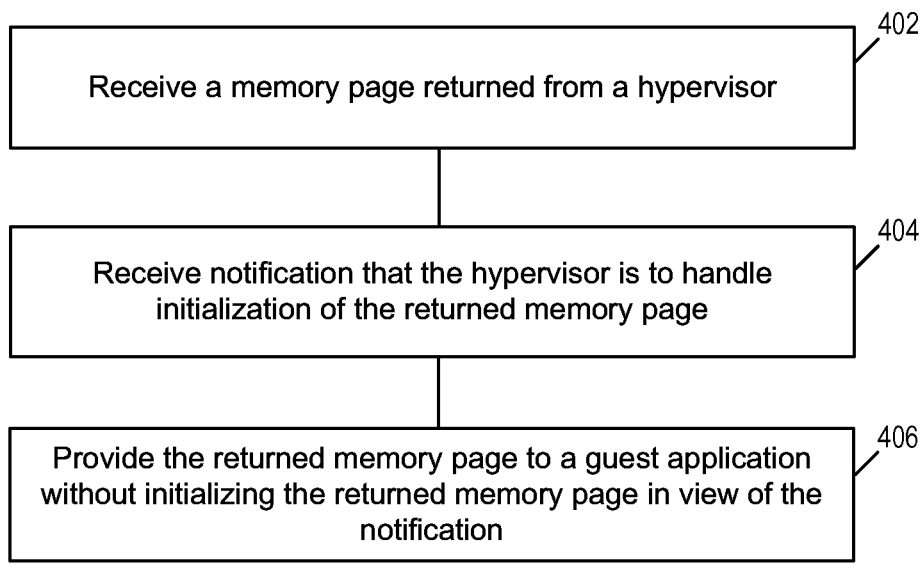
FIG. 4 is a flow diagram illustrating an example of a method for providing a hypervisor-initialized balloon page to a guest application.

FIG. 4 is a flow diagram illustrating an example of a method for providing a hypervisor-initialized balloon page to a guest application. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 400 is performed by guest 160 of FIG. 1.

Method 400 begins at block 402 when a guest 160 receives a memory page returned from a hypervisor. In an example, a memory page (e.g., from a plurality of memory pages) is returned to the guest 160 when the hypervisor 140 deflates a memory balloon 134 on a guest OS 130. For example, a balloon driver 132 may return memory pages from a memory balloon 134 to guest memory 164 in response to a request from memory manager 170 to deflate the memory balloon 134 (e.g., partially or entirely).

At block 404, the guest 160 receives notification that the hypervisor 140 is to handle initialization of the returned memory page. In an example, memory manager 170 sends a notification to guest 160 indicating that hypervisor 140 is handling initialization of one or more memory pages returned to the guest in a memory balloon operation. In one example, the notification sent by the hypervisor 140 comprises one or more guest memory 164 addresses and/or ranges of guest memory addresses that the hypervisor 140 is to initialize. Such notification provides the guest 160 with information regarding an initialization status of memory pages returned, for example, when the hypervisor 140 deflates memory balloon 134. Thus, a guest 160 may use begin to use the guest memory 164 that it knows a hypervisor 140 initializes without first examining and/or reinitializing the guest memory 164.

In an example, a guest 160 updates an area of memory used to track initialization of guest memory 164 pages. For example, a guest 160 may update a bitmap used to track initialization of memory pages. In one example, a guest 160 sets an initialized status bit for each memory page that the hypervisor 140 commits to initializing.

At block 406, the guest 160 provides the returned memory page to a guest application 162 without initializing the returned memory page in view of the notification. In an example, a guest 160 provides a guest application 162 running on the guest 160 with initialized guest memory 164 returned from hypervisor 140 without determining an initialization status of or initializing the returned memory. In one example, the guest 160 relies on a notification provided by the hypervisor 140 indicating that the hypervisor is to initialize the returned memory. Thus, the guest 160 may avoid initialization-related overhead by directly mapping/allocating returned guest memory 164 to a guest application 162 (e.g., as writeable) when the guest 160 is aware that the hypervisor has or will be providing initialization of returned memory pages.

Figure 5:
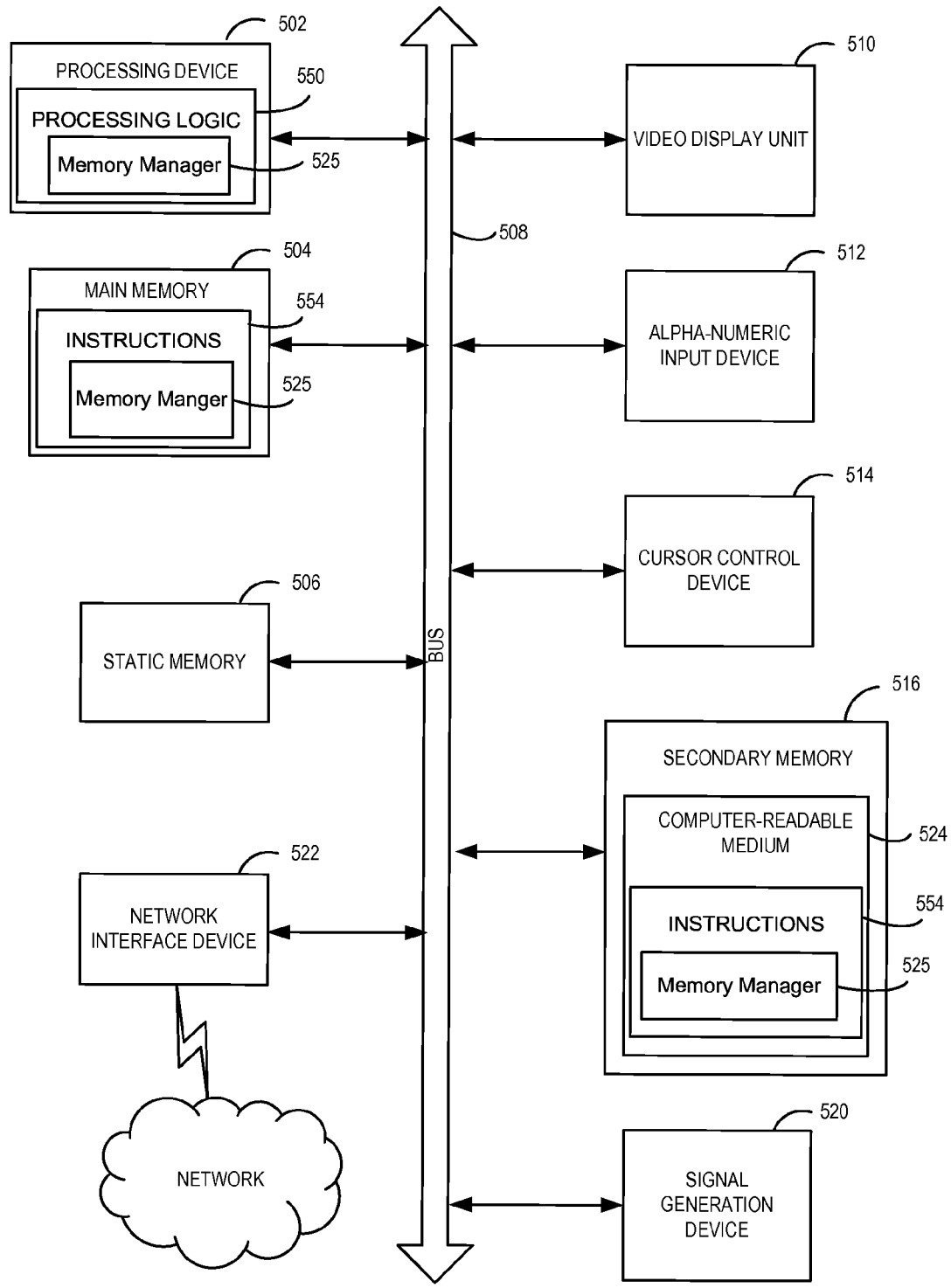
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. The computer system 500 may correspond to host machine 100 of FIG. 1.

In examples of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processing devices such as a microprocessor, central processing unit, or the like. The processing device may include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable medium 524) on which is stored one or more sets of instructions 554 embodying any one or more of the methodologies or functions described herein (e.g., memory manager 525). The instructions 554 may also reside, completely or at least partially, within the main memory 504 and/or within the processing device 502 (e.g., processing logic 550) during execution thereof by the computer system 500 (where the main memory 504 and the processing device 502 constituting machine-readable storage media).

While the computer-readable medium 524 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 500 may additionally include a memory manager module (not shown) for implementing the functionalities of memory manager 170 of hypervisor 140. The modules, components and other features described herein (for example, in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "updating", "determining", "storing", "computing", "comparing", "initializing", "returning", "providing," "mapping," "notifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A computer-implemented method, comprising:
   receiving, by a hypervisor executed by a processing device, a memory page from a guest;
   returning, by the hypervisor, the memory page to the guest; and
   notifying the guest in a message from the hypervisor that the hypervisor is to initialize the returned memory page, the message allowing the guest to identify the returned memory page as initialized without additional processing, and the hypervisor deferring the initializing until the guest accesses the returned memory page.

2. The method of claim 1, further comprising:
   discarding, by the hypervisor, contents of the memory page received from the guest.

3. The method of claim 1, wherein the hypervisor receives the memory page by inflating a memory balloon.

4. The method of claim 3, wherein the hypervisor returns the memory page by deflating the memory balloon.

5. The method of claim 1, further comprising:
   initializing, by the hypervisor, one or more pages of host memory.

6. The method of claim 5, wherein the hypervisor initializes the host memory with a value known to the guest.

7. The method of claim 1, further comprising:
   mapping, by the hypervisor, a guest memory address of the returned memory page to a host memory address of a host memory page.

8. The method of claim 7, wherein the hypervisor creates a read-only mapping between the returned memory page and the host memory page.

9. The method of claim 7, wherein the host memory is initialized.

10. The method of claim 1, further comprising:
    receiving, by the guest, notification that the hypervisor is to initialize the returned memory page; and
    providing, by the guest, the returned memory page to a guest application.

11. The method of claim 10, wherein the guest provides the returned memory page to the guest application without initializing the returned memory page in view of the notification.

12. The method of claim 10, wherein the guest provides the returned memory page to the guest application as writeable memory.

13. The method of claim 10, further comprising:
    detecting, by the hypervisor, when the guest writes to the returned memory page.

14. The method of claim 10, wherein the hypervisor detects a page fault generated when the guest writes to the to the returned memory page.

15. The method of claim 10, further comprising:
    creating, by the hypervisor, a writeable mapping between the returned memory page and an initialized page of host memory.

16. A non-transitory computer-readable medium having instructions recorded thereon, that when executed by a processing device, cause the processing device to perform operations, comprising:
    receiving, by a hypervisor executed by the processing device, a memory page from a guest;
    returning, by the hypervisor, the memory page to the guest; and
    sending, by the hypervisor, a message to the guest indicating that the hypervisor is to initialize the returned memory page, the message allowing the guest to identify the returned memory page as initialized without additional processing, and the hypervisor deferring the initializing until the guest accesses the returned memory page.

17. The non-transitory computer-readable medium of claim 16, the operations further comprising:
    detecting, by the hypervisor, when the guest writes to the returned memory page.

18. The non-transitory computer-readable medium of claim 16, the operations further comprising:
    creating, by the hypervisor, a writeable mapping between the returned memory page and an initialized page of host memory.

19. A system, comprising:
    a memory;
    a processing device; and
    a hypervisor having access to the memory and executed by the processing device, wherein the hypervisor:
    receives a memory page from a guest;
    returns the memory page to the guest; and
    notifies the guest in a message that the hypervisor is to initialize the returned memory page, the message allowing the guest to identify the returned memory page as initialized without additional processing, and the hypervisor deferring the initializing until the guest accesses the returned memory page.

20. The system of claim 19, wherein the hypervisor further:
    detects when the guest writes to the returned memory page; and
    creates a writeable mapping between the returned memory page and an initialized page of host memory.

* * * * *